United States Patent
Dubuque et al.

(10) Patent No.: US 8,413,095 B1
(45) Date of Patent: Apr. 2, 2013

(54) STATISTICAL SINGLE LIBRARY INCLUDING ON CHIP VARIATION FOR RAPID TIMING AND POWER ANALYSIS

(75) Inventors: John P. Dubuque, Jericho, VT (US); Eric A. Foreman, Fairfax, VT (US); Peter A. Habitz, Hinesburg, VT (US); Jeffrey G. Hemmett, St. George, VT (US); Amol A. Joshi, Essex Junction, VT (US); Christopher J. Kiegle, Jericho, VT (US); William J. Wright, Colchester, VT (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/400,680

(22) Filed: Feb. 21, 2012

(51) Int. Cl.
  *G06F 17/50* (2006.01)
  *G06F 9/455* (2006.01)
(52) U.S. Cl. .......... 716/113; 716/108; 716/109
(58) Field of Classification Search .......... 716/108, 716/109, 113
  See application file for complete search history.

(56) References Cited

U.S. PATENT DOCUMENTS

| | | | |
|---|---|---|---|
| 5,770,955 A | 6/1998 | Reynolds | |
| 6,047,248 A | 4/2000 | Georgiou et al. | |
| 7,237,212 B2 | 6/2007 | Kucukcakar et al. | |
| 7,487,475 B1 * | 2/2009 | Kriplani et al. | 716/136 |
| 7,979,829 B2 * | 7/2011 | Smayling | 716/119 |
| 7,992,114 B1 * | 8/2011 | Adams et al. | 716/110 |
| 8,117,575 B2 * | 2/2012 | Lu et al. | 716/106 |
| 8,196,077 B2 * | 6/2012 | Yoda | 716/108 |
| 8,239,798 B1 * | 8/2012 | Goyal et al. | 716/113 |
| 2004/0002844 A1 * | 1/2004 | Jess et al. | 703/14 |
| 2004/0025136 A1 * | 2/2004 | Carelli | 716/17 |
| 2005/0235232 A1 | 10/2005 | Papanikolaou et al. | |
| 2006/0101361 A1 | 5/2006 | Foreman et al. | |
| 2009/0024974 A1 * | 1/2009 | Yamada | 716/6 |
| 2009/0031268 A1 * | 1/2009 | Miranda et al. | 716/6 |

(Continued)

FOREIGN PATENT DOCUMENTS

JP       2001168687 A       6/2001

OTHER PUBLICATIONS

Bhatti et al., "Standard Cell Based Psuedo-Random Clock Generator for Statistical Random Sampling of Digital Signals," IEEE 2007, pp. 1110-1113.

(Continued)

*Primary Examiner* — Thuan Do
*Assistant Examiner* — Magid Dimyan
(74) *Attorney, Agent, or Firm* — Gibb & Riley, LLC; Richard M. Kotulak, Esq.

(57) ABSTRACT

A statistical single library that includes on-chip variation (OCV) is created for timing and power analysis of a digital chip design. Initially, library values for all cells of a digital chip design, including ranges for environmental and process parameters, are subject to a statistical model to create statistical timing for the ranges of the parameters. A statistical timing tool is applied across the ranges of the parameters to determine statistical corners for delay and input power to a subset of cells. The statistically determined delay and input power to the subset of cells is entered into the statistical single library. Each delay of each statistical corner for the subset of cells is compared with a chip sign-off statistical delay requirement of a test macro.

5 Claims, 5 Drawing Sheets

U.S. PATENT DOCUMENTS

| | | | |
|---|---|---|---|
| 2009/0177442 A1 | 7/2009 | Martin et al. | |
| 2009/0217226 A1* | 8/2009 | Cui et al. | 716/6 |
| 2009/0235217 A1 | 9/2009 | Buck et al. | |
| 2009/0265674 A1 | 10/2009 | Buck et al. | |
| 2011/0055793 A1 | 3/2011 | Buck et al. | |
| 2011/0276933 A1* | 11/2011 | Banerji et al. | 716/108 |
| 2011/0289465 A1* | 11/2011 | Adams et al. | 716/113 |

OTHER PUBLICATIONS

Gupta, et al., "Toward a Systematic-Variation Aware Timing Methodology," DAC 2004, 20.3, ACM 1-58113-828-8/04/0006, Jun. 7-11, 2004, pp. 321-326.

* cited by examiner

STATISTICAL SINGLE LIBRARY INCLUDING ON CHIP VARIATION FOR RAPID TIMING AND POWER ANALYSIS

BACKGROUND

1. Field of the Invention

The embodiments generally relate to digital integrated circuit (IC) chip design, and to a method of creating and using a statistical library, i.e., a Liberty model, including delay and power values for all cells, for each of the statistical parameter corners associated with each selected input load and each selected input slew. More particularly, the delay of a single statistical corner from the statistical library may be compared with a chip sign-off statistical delay requirement of a test macro having a same statistical corner definition and a global parameter scaled to match the delay of the single statistical corner from the statistical library, including any on-chip variation, to that of the chip sign-off statistical delay requirement.

2. Description of Related Art

During digital IC chip design, the complexity of the structures included in the design grows with every sequential design phase: from chip planning, synthesis, floor planning placement, clock and test insertion, wiring, and final checks. In every design phase, it is customary to verify the design against the performance specifications for the digital IC chip. One verification process includes timing analysis, which attempts to verify that all timing constraints, e.g., delays, are met for the environmental parameters, e.g. voltage and temperature, of the digital IC chip design. In addition, timing constraints are affected by variations in process parameters, e.g., chemical mechanical polishing, optical proximity effects, random dopant effects, line-edge roughness, dose and focus variation, which introduce on-chip variations for timing constraints. Similarly, aging parameters, e.g., hot-electron transfer and negative bias temperature instability, and N/P mistrack parameters may also introduce on-chip variations for the timing constraints. Such on-chip variations are defined by distances between circuits, and thus, capture the chip topology of the IC circuit design.

Typically, digital IC chip design is facilitated by using standard cells, i.e., standard groups of transistors and interconnects that perform logic or storage functions. Each standard cell is associated with a standard cell library, which includes information related to layout, schematic, symbol, and other logical and simulation views, and timing information related to environmental parameters, such as voltage and temperature.

A library or Liberty model file may include information related to timing and power parameters associated with any standard cell in a particular semiconductor technology. The timing and power parameters may be obtained by simulating the cells under a variety of environmental and manufacturing process conditions and the data is represented in the .lib format, as is well known to those in the art.

One approach to a timing analysis that can handle variations in environmental and process parameters for a digital IC chip design includes conducting multiple static timing analyses. A static timing analysis is conducted for each "corner" of a parameter space, where a corner refers to a multi-dimensional set of discrete environmental and process parameters, for example, process-voltage-temperature (PVT), that cause variations in the static timing analysis of the digital IC chip design. Corners can include a "worst case" corner that provides the slowest path delay between two nodes in a particular circuit path, and a "best case" corner that provides a fastest path delay between the two nodes in the particular circuit path. Bounding the timing for each possible corner of the parameter space leads to a large number of timing runs, i.e., 2N runs for N parameters that take on worst case and best case values. This large number of timing runs makes it difficult to evaluate the performance limits, i.e., timing closure, for a digital IC chip design that includes a large number of parameters.

Although faster and requiring less memory, a single timing run conducted at a single corner of the parameter space can incorporate a global timing margin, i.e., a global timing scalar that is applied to all possible timing outcomes, to ensure acceptable performance outcomes. However, large global margins are needed to ensure that each timing outcome passes the worst case condition including on-chip variation (OCV) of manufacturing process parameters. Such large global margins are unduly pessimistic.

Timing outcomes can also be determined by using a statistical static timing analysis that propagates timing quantities as probabilistic statistical distributions instead of single-valued deterministic values. In statistical static timing analysis, statistical minimum and maximum operations are used to calculate timing outcomes for the propagated statistical distributions through all cells and timing paths of the digital IC chip design. As the inputs to these operations are functions of statistical distributions, the outputs of statistical minimum or maximum operations are also functions of statistical distributions. These propagated statistical distributions will typically overlap, such that each one will produce a minimum or maximum for some percentage of the time over numerous samples. Therefore, the output function is defined as a linear combination of all of the inputs, with each input weighted by the probability that it will produce either the minimum or the maximum result. Such statistical static timing analysis, however, requires the greatest amount of run time and memory because the propagated statistically distributed timing outputs are evaluated for every cell and every timing arc of the digital IC chip design across each of the range values of every one of the environmental and process parameters.

There remains a need to perform a timing and power analysis of a digital IC chip design that avoids the run time and memory requirements of a statistical static timing analysis of an entire digital IC chip design, yet utilizes the shorter run times and smaller memory requirements of deterministic static timing analyses for environmental, process, aging, and N/P mistrack parameters, and provides the lesser pessimism, associated with on-chip variation (OCV), as opposed to global margins.

SUMMARY

In view of the foregoing, an exemplary embodiment may provide a computer-implemented method of creating a statistical single worst case (WC) library, using a Liberty model, and including on-chip variation (OCV). The method may include receiving libraries for all cells of a digital chip design including ranges for supply voltage, input load, input slew, and temperature parameters, and any of chip mean and OCV process, aging, and N/P mistrack parameters. The method may also include applying a statistical model created for statistical timing to the ranges for supply voltage, input load, input slew, and temperature parameters, and any of the chip mean process, aging, and N/P mistrack parameters. The method may further include applying a statistical timing tool across the ranges for supply voltage, input load, input slew, and temperature parameters, and any of the chip mean process, aging, and N/P mistrack parameters to determine WC statistical corners for delay and power to all of the cells for selected input loads from the input load range and selected input slew from the input slew range. Finally, the method may include entering the delay and power to all of the cells, for each of the WC statistical corners, associated with each selected input load and each selected input slew, into the statistical single WC library.

Another exemplary embodiment may provide a computer-implemented method for using a statistical single worst case (WC) library, using a Liberty model, and including on-chip variation (OCV), for timing and power analysis. The method may include receiving libraries for all cells of a digital chip design including ranges for supply voltage, input load, input slew, and temperature parameters, and any of chip mean and OCV process, aging, and N/P mistrack parameters. The method may also include applying a statistical model created for statistical timing to the ranges for supply voltage, input load, input slew, and temperature parameters, and any of the chip mean process, aging, and N/P mistrack parameters. The method may further include applying a statistical timing tool across the ranges for supply voltage, input load, input slew, and temperature parameters, and any of the chip mean process, aging, and N/P mistrack parameters to determine WC statistical corners for delay and input power to a subset of all of the cells for selected input loads from the input load range and selected input slews from the input slew range. The method may yet further include entering the delay and the input power to the subset of all of the cells, for each of the WC statistical corners, associated with each selected input load and each selected input slew, into the statistical single WC library. The method may yet further include comparing each delay of each WC statistical corner from the statistical single WC library for the subset of all of the cells with a chip sign-off statistical delay requirement of a test macro having a same statistical corner definition, the subset of all of the cells corresponding to the test macro. Finally, the method may include scaling a sensitivity associated with any single OCV process, aging, and N/P mistrack parameter with a global parameter to match each delay of each WC statistical corner from the statistical single WC library to the chip sign-off statistical delay requirement of the test macro.

Yet another exemplary embodiment may provide a computer-implemented method for creating a statistical single early/late delta margin library, using a Liberty model, and including on-chip variation (OCV). The method may include receiving libraries for all cells of a digital chip design including ranges for supply voltage, input load, input slew, and temperature parameters, and any of chip mean and OCV process, aging, and N/P mistrack parameters. The method may also include applying a statistical model created for statistical timing to the ranges for supply voltage, input load, input slew, and temperature parameters, and any of the chip mean process, aging, and N/P mistrack parameters. The method may further include applying a statistical timing tool across the ranges for supply voltage, input load, input slew, and temperature parameters, and any of the chip mean process, aging, and N/P mistrack parameters to determine worst case (WC) margin and best case (BC) margin statistical corners for delay and power to all of the cells for selected input loads from the input load range and selected input slews from the input slew range. Finally, the method may include entering early/late delta margin delay and an early/late delta margin input power to all of the cells, based on a difference between each of the WC margin and BC margin statistical corners, associated with each selected input load and each selected input slew, into the statistical single early/late delta margin library.

Yet another exemplary embodiment may provide a computer-implemented method for creating a statistical single worst case (WC) library, using a Liberty model, and including on-chip variation (OCV). The method may include receiving libraries for all cells of a digital chip design including ranges for supply voltage, input load, input slew, and temperature parameters, and any of chip mean and OCV process, aging, and N/P mistrack parameters. The method may also include applying a statistical model created for statistical timing to the ranges for supply voltage, input load, input slew, and temperature parameters, and any of the chip mean process, aging, and N/P mistrack parameters. The method may further include applying a Monte Carlo statistical analysis across the ranges for supply voltage, input load, input slew, and temperature parameters, and any of the chip mean process, aging, and N/P mistrack parameters to determine 3-sigma WC statistical corners for delay and input power to all of the cells for selected input loads from the input load range and selected input slews from the input slew range. Finally, the method may include entering the delay and the input power to all of the cells, for each of the WC statistical corners, associated with each selected input load and each selected input slew, into the statistical single WC library.

BRIEF DESCRIPTION OF THE SEVERAL VIEWS OF THE DRAWINGS

The embodiments herein will be better understood from the following detailed description with reference to the drawings, which are not necessarily drawing to scale and in which.

DETAILED DESCRIPTION

As stated above, there remains a need to perform a timing and power analysis of a digital IC chip design that avoids the run time and memory requirements of a statistical static timing analysis of an entire digital IC chip design, yet utilizes the shorter run times and smaller memory requirements of deterministic static timing analyses for environmental, process, aging, and N/P mistrack parameters, and provides the lesser pessimism, associated with on-chip variation (OCV), as opposed to global margins.

Multiple static timing analyses typically cover only a subset of all possible corners of a full parameter space, including environmental parameters, such as, voltage and temperature; process parameters, such as, chemical mechanical polishing, optical proximity effects, random dopant effects, line-edge roughness, and dose and focus variation; aging parameters, such as, hot-electron transfer and negative bias temperature instability; and N/P mistrack parameters that affect timing and power outcomes for a standard cell type used in a digital IC chip design. In addition, static timing analyses, which may be adjusted by global parameters, do not account for on-chip variation (OCV) across a single die. Therefore, although requiring modest run times and memory, there exists the possibility of producing non-functional digital IC chips, if the environmental conditions and/or the process, aging, and N/P mistrack conditions differ from the limited set of process corners used in static timing analysis.

Statistical static timing analysis, which propagates timing quantities as probabilistic statistical distributions instead of single-valued deterministic values through every cell and timing are across each of the range values of every one of the environmental, process, aging, and N/P mistrack parameters, may provide timing outcomes from a single run for all possible process corners, but with unacceptably long run times, e.g., several days, for a typical digital IC chip design, and unacceptably large memory requirements, i.e., memories from several computers.

Figure 1:
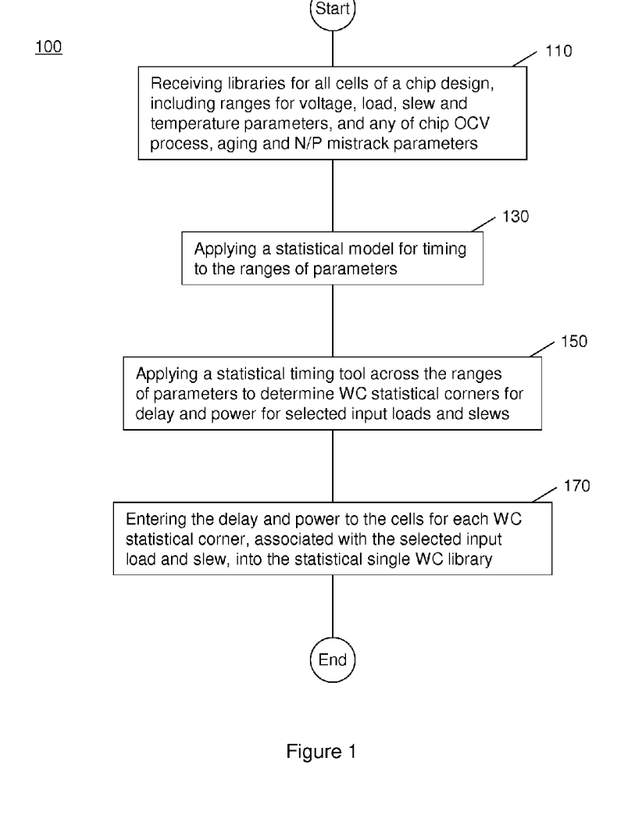
FIG. 1 is a flow chart illustrating a method of creating a statistical single worst case (WC) library, i.e., a Liberty model, that includes on-chip variation (OCV) of any of manufacturing process, aging, and N/P mistrack parameters in an exemplary embodiment.

Referring to the flow chart 100 of FIG. 1, a statistical single worst case (WC) library, i.e., a Liberty model, including on-chip variation (OCV) of any of manufacturing process, aging, and N/P mistrack parameters, may be created in an exemplary embodiment. A statistical WC library value may correspond to a 3-sigma statistical distribution value for either delay or power to a cell of a digital IC chip design, beyond which the delay or power value fails design requirements. The exemplary embodiment may receive libraries, i.e., Liberty models, for all cells of a digital IC chip design that include ranges of supply voltage (Vdd), input load that includes input capacitive loads, input slew, and temperature parameters, and that include any of chip mean and OCV manufacturing process, aging, and N/P mistrack parameters 110. The particular semiconductor technology of the digital IC chip design may be characterized by a temperature inversion, i.e., a negative temperature coefficient with respect to delay, over the temperature range. Power values may include both static power and dynamic power supplied to any of the cells.

The exemplary embodiment may apply a statistical model, created for statistical timing of cells in digital IC chip design, to the ranges of supply voltage (Vdd), input load, input slew, and temperature parameters, and any of the chip mean process, aging, and N/P mistrack parameters 130. The statistical model may be implemented by statistical timing design code developed by or for the designer of the digital IC chip design. During the initial design phase, on-chip manufacturing process variation is not yet known, as the design had not yet been manufactured.

The exemplary embodiment may apply a statistical timing tool across the ranges for supply voltage (Vdd), input load, input slew, and temperature parameters, and any of the chip mean process, aging, and N/P mistrack parameters to determine WC statistical corners for delay and power to the cells for selected input loads from the input load range and selected input slews from the input slew range 150.

The exemplary embodiment may enter the delay and the power to all of the cells, for each of the WC statistical corners, associated with each selected input load and each selected input slew, into the statistical single WC library, i.e., a Liberty model, 170.

Figure 2:
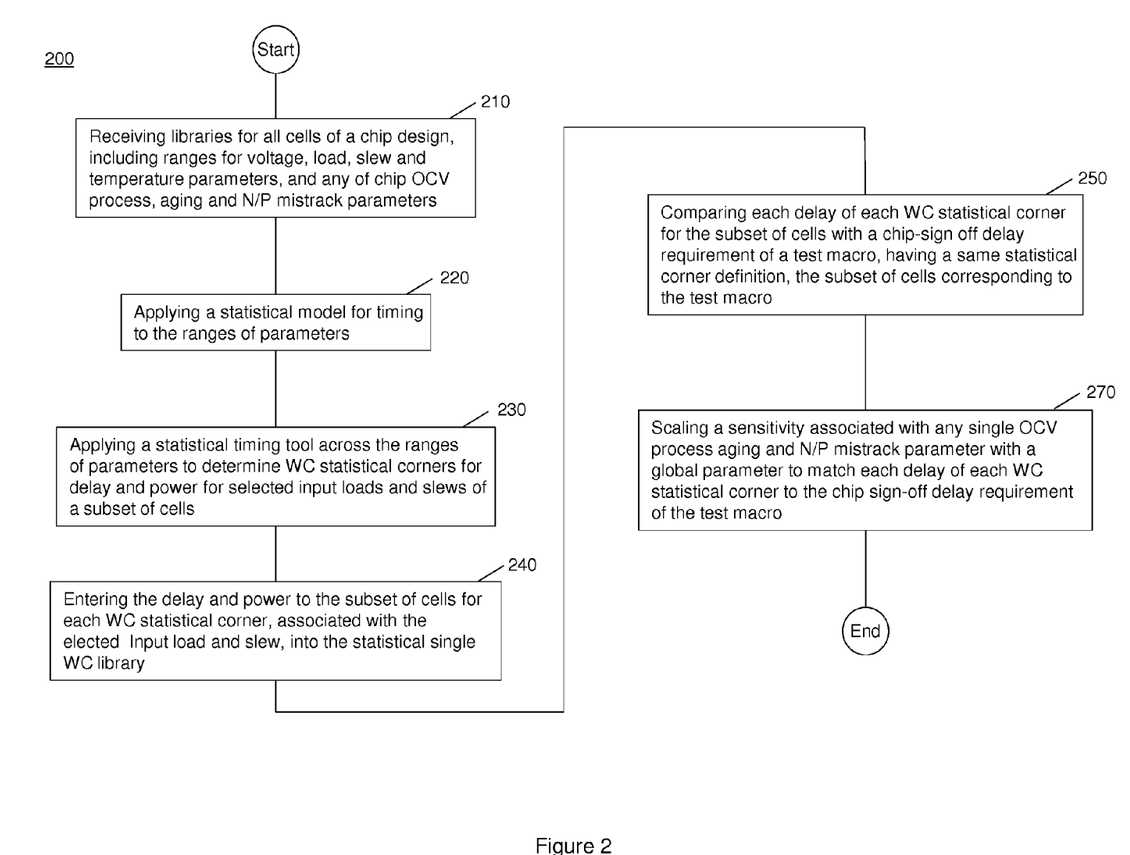
FIG. 2 is a flow chart illustrating a method using a statistical single worst case (WC) library, i.e., a Liberty model, that includes on-chip variation (OCV) of any of manufacturing process, aging, and N/P mistrack parameters, for timing and power analysis of an initial phase of a digital IC chip design in an exemplary embodiment.

Referring to the flow chart 200 of FIG. 2, a statistical single worst case (WC) library, i.e., a Liberty model, including on-chip variation (OCV) of any of manufacturing process, aging, and N/P mistrack parameters, may be used for timing and power analysis of an initial phase of a digital IC chip design in an exemplary embodiment. A statistical WC library value may correspond to a 3-sigma statistical distribution value for either delay or power to a cell of a digital IC chip design, beyond which the delay or power value fails design requirements. The exemplary embodiment may receive libraries, i.e., Liberty models, for all cells of a digital IC chip design that include ranges of supply voltage (Vdd), input load that includes input capacitive loads, input slew, and temperature parameters, and that include chip mean and OCV manufacturing process, aging, and N/P mistrack parameters 210. The particular semiconductor technology of the digital IC chip design may be characterized a temperature inversion, i.e., a negative temperature coefficient with respect to delay, over the temperature range. Power values may include both static power and dynamic power supplied to any of the cells.

The exemplary embodiment may apply a statistical model, created for statistical timing of cells in digital IC chip design, to the ranges of supply voltage (Vdd), input load, input slew, and temperature parameters, and the chip mean process, aging, and N/P mistrack parameters 220. The statistical model may be implemented by statistical timing design code developed by or for the designer of the digital IC chip design. During the initial design phase, on-chip manufacturing process variation is not yet known, as the design had not yet been manufactured.

The exemplary embodiment may apply a statistical timing tool across the ranges for supply voltage (Vdd), input load, input slew, and temperature parameters, and the chip mean process, aging, and N/P mistrack parameters to determine WC statistical corners for delay and power to a subset of the cells for selected input loads from the input load range and selected input slews from the input slew range 230.

The exemplary embodiment may enter the delay and the power to the subset of the cells, for each of the WC statistical corners, associated with each selected input load and each selected input slew, into the statistical single WC library, i.e., a Liberty model, 240.

The exemplary embodiment may compare each delay of each WC statistical corner from the statistical single WC library, i.e., a Liberty model, for the subset of cells with a chip sign-off statistical delay requirement of a test macro having a same statistical corner definition, where the subset of cells corresponds to the test macro 250. The test macro may comprise a subset of the cells of the digital IC chip design that is subject to the chip sign-off statistical delay requirement. The chip sign-off statistical delay requirement may be based on closed timing of the test macro that corresponds to the subset of cells for the digital IC chip design. By using a subset of cells, corresponding to the test macro, the initial design phase reduces the number of statistical corners that need be evaluated, while the chip-sign off statistical delay requirement may introduce delays and power that are subject to manufacturing process, aging, and N/P mistrack parameters.

The exemplary embodiment may scale a sensitivity associated with any single on-chip variation (OCV) manufacturing process, aging, and N/P mistrack parameter with a global parameter to match each delay of each WC statistical corner from the statistical WC library, i.e., a Liberty model, to the chip sign-off statistical delay requirement of the test macro 270. The sensitivity may reflect the variation in delay or power of the statistical WC library, i.e., a Liberty model, values to any single OCV manufacturing process, aging, and N/P mistrack parameter. The global parameter may, in turn, be used to scale the delay or power of each WC statistical corner from the statistical single WC library, i.e., a Liberty model, to match the corresponding statistical corners of the test macro, which has met the chip sign-off statistical delay requirement for design of the digital IC chip. The matching of the delay of the single WC statistical corner from the statistical single WC library to the chip sign-off statistical delay requirement of the test macro may comprise less than 20%, preferably less than 10%, and more preferably less than 5% of the cells of the single WC statistical corner from the statistical single WC library having delays that fail the chip sign-off statistical delay requirement of the test macro. The matched delays of the single WC statistical corner from the statistical single WC library to the chip sign-off statistical delay requirement of the test macro may be subject to selective voltage binning to reduce power among the cells showing matched delays, and the resulting selective voltage binning information may be added to the statistical single WC library, i.e., a Liberty model.

Figure 3:
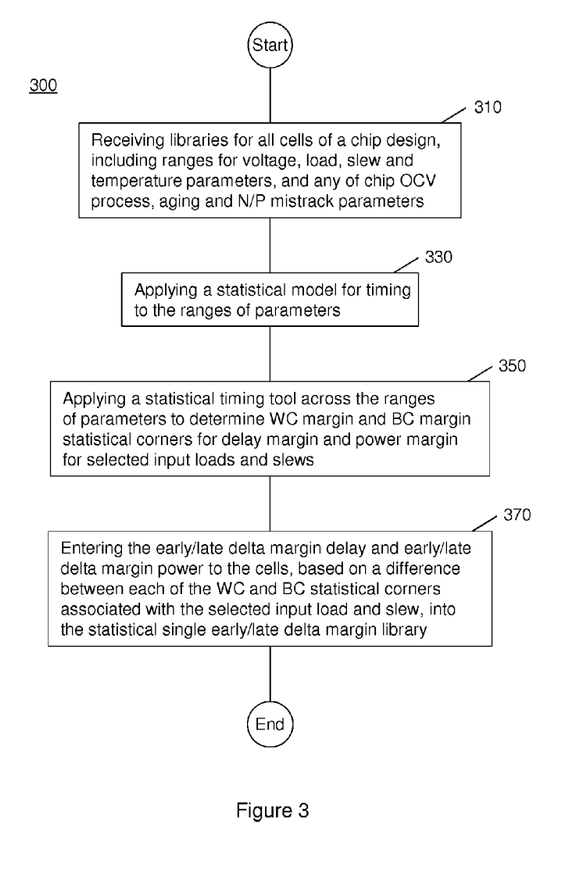
FIG. 3 is a flow chart illustrating a method of creating a statistical single early/late delta margin library, i.e., a Liberty model, that includes on-chip variation (OCV) of any of manufacturing process, aging, and N/P mistrack parameters in an exemplary embodiment.

Referring to the flowchart 300 of FIG. 3, a statistical single early/late delta margin library, i.e., a Liberty model, including on-chip variation (OCV), may be created in an exemplary embodiment. The statistical early/late delta margin library may include only the worst timing margins that cover, for example, hold tests. A statistical worst case (WC) margin and best case (BC) margin library value may correspond to a 3-sigma statistical distribution value for either delay margin or power margin to a cell of a digital IC chip design, beyond which the delay margin or power margin value fails design requirements. The exemplary embodiment may receive libraries, i.e., Liberty models, for all cells of a digital IC chip design that include ranges of supply voltage (Vdd), input load that includes input capacitive loads, input slew, and temperature parameters, and that include any of chip mean and OCV manufacturing process, aging, and N/P mistrack parameters 310. The particular semiconductor technology of the digital IC chip design may be characterized a temperature inversion, i.e., a negative temperature coefficient with respect to delay, over the temperature range. Power values may include both static power and dynamic power supplied to any of the cells.

The exemplary embodiment may apply a statistical model, created for statistical timing of cells in digital IC chip design, to the ranges of supply voltage (Vdd), input load, input slew, and temperature parameters, and any of the chip mean process, aging, and N/P mistrack parameters 330. The statistical model may be implemented by statistical timing design code developed by or for the designer of the digital IC chip design. During the initial design phase, across chip manufacturing process variation is not yet known, as the design had not yet been manufactured.

The exemplary embodiment may apply a statistical timing tool across the ranges for supply voltage (Vdd), input load, input slew, and temperature parameters, and any of the chip mean process, aging, and N/P mistrack parameters to determine WC margin and BC margin statistical corners for delay margin and power margin to the cells for selected input loads from the input load range and selected input slews from the input slew range 350.

The exemplary embodiment may enter the early/late delta margin delay and the early/late delta margin power to all of the cells, based on a difference between each of the WC and BC statistical corners for each of the WC statistical corners, associated with each selected input load and each selected input slew, into the statistical single early/late delta margin library, i.e., a Liberty model 370. The WC margin and BC margin statistical corners for the delay margin and the power margin may correspond to minus (−) and plus (+) 3-sigma statistical values.

Figure 4:
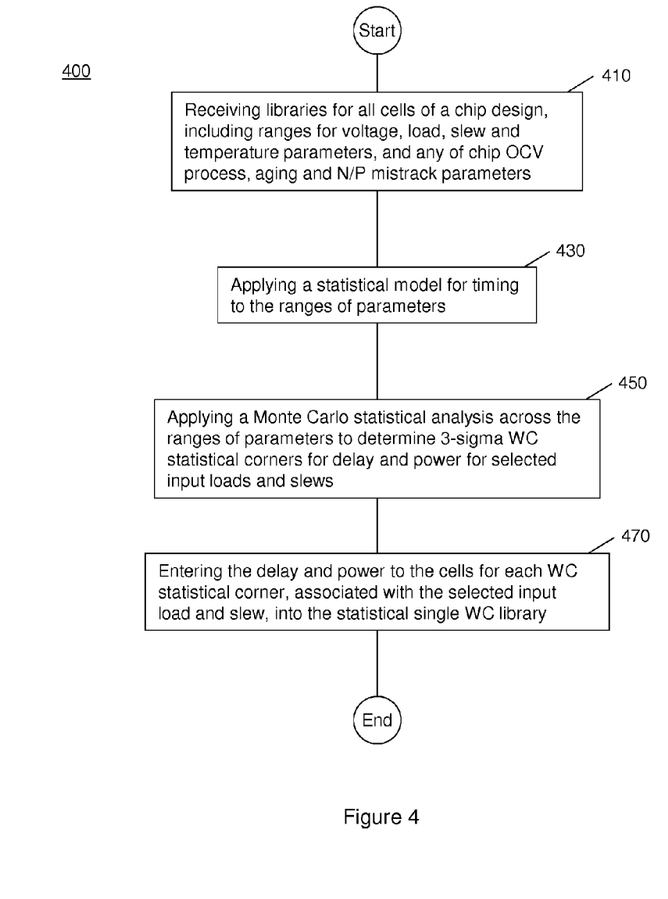
FIG. 4 is a flowchart illustrating a method of creating a statistical single worst case (WC) library, i.e., a Liberty model, including on-chip variation (OCV) of manufacturing process, aging, and N/P mistrack parameters, using a Monte Carlo statistical timing analysis, in an exemplary embodiment.

Referring to the flowchart 400 of FIG. 4, a statistical single worst case (WC) library, i.e., a Liberty model, including on-chip variation (OCV) of manufacturing process parameters, using a Monte Carlo statistical timing analysis, may be created in an exemplary embodiment. A statistical WC library value may correspond to a 3-sigma statistical distribution value for either delay or power to a cell of a digital IC chip design, beyond which the delay or power value fails design requirements. The exemplary embodiment may receive libraries, i.e., Liberty models, for all cells of a digital IC chip design that include ranges of supply voltage (Vdd), input load that includes input capacitive loads, input slew, and temperature parameters, and that include any of chip mean and OCV manufacturing process, aging, and N/P mistrack parameters 410. The particular semiconductor technology of the digital IC chip design may be characterized a temperature inversion, i.e., a negative temperature coefficient with respect to delay, over the temperature range. Power values may include both static power and dynamic power supplied to any of the cells.

The exemplary embodiment may apply a statistical model, created for statistical timing of cells in digital IC chip design, to the ranges of supply voltage (Vdd), input load, input slew, and temperature parameters, and any of the chip mean process, aging, and N/P mistrack parameters 430. The statistical model may be implemented by statistical timing design code developed by or for the designer of the digital IC chip design. During the initial design phase, on-chip manufacturing process variation is not yet known, as the design had not yet been manufactured.

The exemplary embodiment may apply a Monte Carlo statistical analysis across the ranges for supply voltage (Vdd), input load, input slew, and temperature parameters, and any of the chip mean process, aging, and N/P mistrack parameters to determine 3-sigma WC statistical corners for delay and power to the cells for selected input loads from the input load range and selected input slews from the input slew range 450.

The exemplary embodiment may enter the delay and the power to all of the cells, for each of the WC statistical corners, associated with each selected input load and each selected input slew, into the statistical single WC library, i.e., a Liberty model, 470.

As will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the embodiments herein are described below with reference to flowchart illustrations and/or block diagrams of methods, apparatus (systems) and computer program products according to the embodiments herein. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
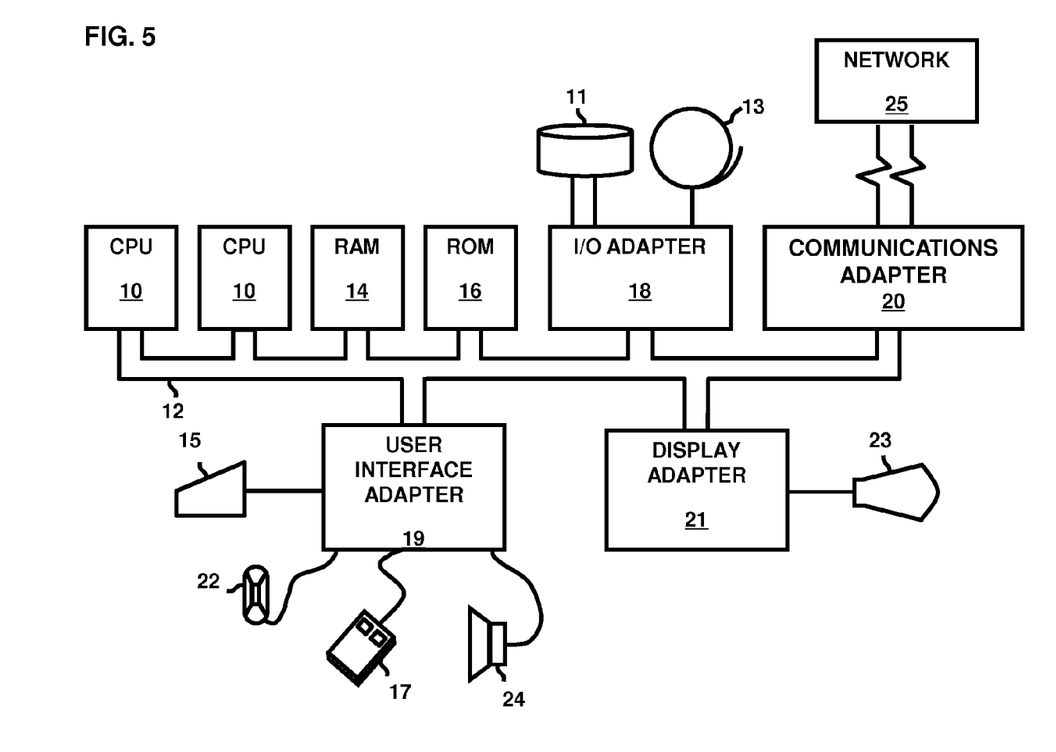
FIG. 5 is a block diagram illustrating a hardware environment for practicing the embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment include loading directly in the client, server and proxy computers via loading a storage medium such as a CD, DVD, etc., The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108. The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A computer-implemented method for creating a statistical single worst case (WC) library, using a Liberty model, and including on-chip variation (OCV), said method comprising:

receiving, by a computer, libraries for all cells of a digital chip design including ranges for supply voltage, input load, input slew, and temperature parameters, and any of chip mean and OCV process, aging, and N/P mistrack parameters;

applying, by said computer, a statistical model created for statistical timing to said ranges for supply voltage, input load, input slew, and temperature parameters, and said any of chip mean process, aging, and N/P mistrack parameters;

applying, by said computer, a statistical timing tool across said ranges for supply voltage, input load, input slew, and temperature parameters, and said any of chip mean process, aging, and N/P mistrack parameters to determine WC statistical corners for delay and power to said all cells for selected input loads from said input load range and selected input slews from said input slew range;

entering, by said computer, said delay and said power to said all cells, for each of said WC statistical corners, associated with each selected input load and each selected input slew, into said statistical single WC library.

2. The method of claim 1, said libraries comprising Liberty models relating to timing and power parameters associated with any cell of a particular semiconductor technology.

3. The method of claim 1, said OCV process parameters including: chemical mechanical polishing; optical proximity effects; random dopant effects; line-edge roughness, and dose and focus variation; and said OCV aging parameters including hot-electron transfer and negative bias temperature instability.

4. The method of claim 2, said particular semiconductor technology being characterized by a temperature inversion over said temperature range.

5. The method of claim 1, said power including static power and dynamic power.

* * * * *